United States Patent
Ryu et al.

(10) Patent No.: US 8,749,609 B2
(45) Date of Patent: *Jun. 10, 2014

(54) APPARATUS, SYSTEM AND METHOD FOR VIDEO CALL

(75) Inventors: Hee-seob Ryu, Hwaseong-si (KR);
Seung-kwon Park, Yongin-si (KR);
Chang-yong Kim, Yongin-si (KR);
Jong-hyuk Jang, Gunpo-si (KR);
Young-kwang Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 530 days.

This patent is subject to a terminal disclaimer.

(21) Appl. No.: 13/039,892

(22) Filed: Mar. 3, 2011

(65) Prior Publication Data

US 2011/0193933 A1 Aug. 11, 2011

Related U.S. Application Data

(63) Continuation-in-part of application No. 12/570,317, filed on Sep. 30, 2009, now Pat. No. 8,390,665.

(30) Foreign Application Priority Data

Sep. 3, 2009 (KR) .................. 10-2009-0083177

(51) Int. Cl.
*H04N 7/14* (2006.01)
*H04W 74/00* (2009.01)
*G01S 5/00* (2006.01)

(52) U.S. Cl.
USPC .................. 348/14.08; 348/14.01; 455/404.1; 455/456.5; 455/456.6

(58) Field of Classification Search
USPC ............ 348/14.01, 14.08, 207.99; 342/357.1; 455/404.1, 456.5, 456.6
See application file for complete search history.

(56) References Cited

U.S. PATENT DOCUMENTS

| 5,793,367 A | 8/1998 | Taguchi | |
|---|---|---|---|
| 6,643,516 B1 * | 11/2003 | Stewart | 455/456.6 |

(Continued)

FOREIGN PATENT DOCUMENTS

| JP | 9-149391 A | 6/1997 |
|---|---|---|
| JP | 2003-158727 A | 5/2003 |
| JP | 2003-533140 A | 11/2003 |

OTHER PUBLICATIONS

Notice of Allowance dated Oct. 29, 2012 issued by the United States Patent and Trademark Office in related U.S. Appl. No. 12/570,317.

(Continued)

*Primary Examiner* — Gerald Gauthier
(74) *Attorney, Agent, or Firm* — Sughrue Mion, PLLC

(57) ABSTRACT

An apparatus, system and method for implementing a video call between a first caller and a second caller are provided. The apparatus includes: an image sensor which captures an image of the first caller; a display which displays an image of the second caller; a microphone which captures an audio input by the first caller; a speaker which outputs an audio input by the second caller; a detector which is configured to determine a location of the first caller; and a controller which controls the detector to determine the location of the first caller as corresponding to an original location, wherein in response to the first caller changing a location from the original location to a new location, the controller controls the detector to determine the location of the first caller as being the new location, and controls the microphone to adjust a configuration of the microphone based on the new location of the first caller.

43 Claims, 13 Drawing Sheets

(56) References Cited

U.S. PATENT DOCUMENTS

| | | |
|---|---|---|
| 6,766,035 B1 | 7/2004 | Gutta |
| 7,224,956 B1 * | 5/2007 | O'Neil .................. 455/404.1 |
| 7,295,240 B2 | 11/2007 | Kobayashi et al. |
| 7,797,383 B2 | 9/2010 | Baird |
| 7,903,137 B2 * | 3/2011 | Oxford et al. ............ 348/14.01 |
| 8,390,665 B2 * | 3/2013 | Ryu et al. ................ 348/14.01 |
| 8,559,982 B2 * | 10/2013 | Wu et al. ................. 455/456.5 |
| 2002/0000930 A1 * | 1/2002 | Crowson et al. ........... 342/357.1 |
| 2008/0246833 A1 * | 10/2008 | Yasui et al. .............. 348/14.08 |
| 2008/0273078 A1 | 11/2008 | Grasley et al. |
| 2010/0085415 A1 | 4/2010 | Rahman |
| 2010/0157016 A1 * | 6/2010 | Sylvain ................... 348/14.08 |
| 2011/0050840 A1 * | 3/2011 | Ryu et al. ................. 348/14.01 |
| 2011/0164141 A1 * | 7/2011 | Tico et al. ................ 348/207.99 |
| 2011/0193933 A1 * | 8/2011 | Ryu et al. ................. 348/14.08 |

OTHER PUBLICATIONS

Non-Final Rejection dated May 30, 2012 issued by the United States Patent and Trademark Office in counterpart U.S. Appl. No. 12/570,317.

Communication dated Apr. 23, 2014, issued by the Korean Intellectual Property Office in counterpart Korean Application No. 10-2010-0084727.

* cited by examiner

APPARATUS, SYSTEM AND METHOD FOR VIDEO CALL

CROSS-REFERENCE TO RELATED APPLICATION

This application is a continuation-in-part of U.S. patent application Ser. No. 12/570,317, filed on Sep. 30, 2009 now U.S. Pat. No. 8,390,665, which claims priority from Korean Patent Application No. 10-2009-0083177, filed on Sep. 3, 2009 in the Korean Intellectual Property Office. The disclosures of these applications are incorporated herein by reference.

BACKGROUND

1. Field

Apparatuses, systems and methods consistent with the exemplary embodiments relate to a video call, and more particularly, to a video call based on a location of a user.

2. Description of the Related Art

Video conferencing has become a popular method of communication between users. As used herein, the terms "video conference" and "video conferencing" are synonymous with a video call and video calling, respectively. Video conferencing includes both audio and video components. That is, a video call between parties provides for audio and video communications between users. In terms of hardware, a user simply needs a display device, a speaker (or speakers), an image sensor and a microphone (or microphones), in order to simultaneously conduct a video call with one or more parties. The display device itself can be any type of display, including but not limited to a television (TV), a computer monitor, etc. The image sensor may include more than one image sensing device.

In order to facilitate a video call, a display device is used to show one or more parties to the call. For example, in a video conference between two people, the image of each party is captured by their respective image sensors, and the display device on each party's side shows an image of the other party, or alternatively, shows images for both the caller and the called party. Similarly, each party to the call speaks into their respective microphones, whereupon the respective speakers play the conversation so that each party can hear the audio portion of the call.

However, a problem exists if any party to a video call moves from an original location to another location. For example, a party to a call may move away from the location where the image sensor, microphone and speakers are positioned. In such a case, the capturing and playing of the video and the audio becomes problematic. Consequently, there is a need for an improved way of facilitating a video call.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

As used herein, the term "image" may include a still image or a video stream. The image may also be a broadcast image, or an image retrieved from a storage device. The term "display" (i.e., the noun) or "display device" includes a television, a computer monitor, etc. Additionally, the terms "party," "user," "person" and "caller" are used interchangeably herein. The terms "location" and "position" are also used interchangeably herein. In some instances, the above-noted interchangeable terms may be used in a distinguishing manner for purposes of clarity.

According to an aspect of an exemplary embodiment, there is provided a video call apparatus for implementing a video call between a first caller and a second caller, the apparatus including: an image sensor which captures an image of the first caller; a display which displays an image of the second caller; a microphone which captures an audio input by the first caller; a speaker which plays an audio input by the second caller; a detector which is configured to determine a location of the first caller; and a controller which controls the detector to determine the location as corresponding to an original location, wherein if the first caller changes a location from the original location to a new location, the controller controls the detector to determine the location as being the new location and controls the microphone to adjust a configuration of the microphone based on the new location of the first caller.

If the location, is determined as being the new location, the controller may further control the image sensor to adjust a configuration of the image sensor based on the new location of the first caller.

If the location is determined as being the new location, the controller may further control the speaker to adjust a configuration of the speaker based on the new location of the first caller.

The controller may control the display in order to display the image of the second caller within a window, and if the first caller changes location from the original location to a new location, the controller may control the display to move the window to a different position on the display corresponding to the determined new location.

The display may further display an image of the first caller.

The controller may control the display to display the image of the first caller in a first window at a first position on the display, and the image of the second caller in a second window at a second position on the display, and if the first caller changes the location from the original location to the new location, the controller may control the display to move the location of the first window from the first position to a new first position according to the new location of the first caller, and may control the display to move the location of the second window from the second position to a new second position according to the new location of the first caller.

The detector may determine the location of the first caller by using at least one of the image sensor and the microphone to determine the location of the first caller.

The configuration of the image sensor may be adjusted based on the new location by changing at least one of a pan angle, a tilt angle and a zoom value of the image sensor to correspond to the detected change in location of the first caller.

The configuration of the microphone may adjusted based on the new location by changing a directionality of the microphone.

The configuration of the speaker may adjusted based on the new location by changing a directionality of the speaker.

If the display displays a secondary image in a background window, the controller may control the display to display the image of the second caller in a foreground window, and if the first caller changes location from the original location to the new location, the controller may control the display to move the window to a different position on the display corresponding to the new location without interrupting the display of the secondary image in the background window. In keeping with definition of the term "image" as noted above, the secondary image may be a plurality of images (e.g., a video) or a still, or single image. Further, the secondary image(s) may be received via a broadcast signal or retrieved from a storage device.

According to an aspect of another exemplary embodiment, there is provided a video call system for implementing a conference video call between a plurality of callers at a first location and at least one caller at a second location, the system including: an image sensor which captures an image of a caller from among the plurality of callers at the first location; a display which displays an image of the at least one caller at the second location; a microphone which captures an audio input from the caller among the plurality of callers at the first location; a speaker which outputs an audio input from the at least one caller at the second location; a detector which is configured to determine a position of a caller currently speaking at the first location; and a controller, wherein if a first caller, from among the plurality of callers at the first location, begins speaking, the controller controls the detector to determine the position of the caller currently speaking as being a position of the first caller, and if a second caller, from among the plurality of callers at the first location, begins speaking, the controller controls the detector to determine the position of the caller currently speaking as being a position of the second caller and controls the microphone to adjust a configuration of the microphone based on the determined position of the caller currently speaking.

According to an aspect of another exemplary embodiment, there is provided a method of implementing a video call between a first caller and a second caller, the method including: capturing, by an image sensor, an image of the first caller; displaying, on a display, an image of the second caller; capturing an audio input by the first caller; outputting, by a speaker, an audio input by the second caller; determining a location of the first caller with respect to a predetermined position; and if the first caller changes from an original location to a new location, controlling the microphone to adjust a configuration of the microphone based on the new location of the first caller.

According to an exemplary embodiment, if the first caller changes to a new location, the method may further include controlling the image sensor to adjust a configuration of the image sensor based on the new location of the first caller.

According to an exemplary embodiment, if the first caller changes from the original location to a new location, the method may further include controlling the speaker to adjust a configuration of the speaker based on the new location of the first caller.

According to an exemplary embodiment, the method may further include displaying, in a window an image of the second caller, and if the first caller changes from the original location from the original location to the new location, moving the window to a different position on the display corresponding to the new location.

The method may further include displaying an image of the first caller.

The method may further include displaying the image of a first caller in a first window at a first position on the display, and the image of the second caller in a second window at a second position on the display, and if the first caller changes from the original location to the new location, the method may further include moving the first window from the first position to a new first position according to the new location of the first caller, and moving the second window from the second position to a new second position according to the new location of the first caller.

The determining of the location of the first caller may be performed by using at least one of the image sensor and the microphone.

The controlling of the image sensor to adjust the configuration of the image sensor based on the new location may be performed by changing at least one of a pan angle, tilt angle and a zoom value of the image sensor to correspond to the new location of the first caller.

The controlling of the microphone to adjust the configuration of the microphone based on the new location may be performed by changing a directionality of the microphone.

The controlling of the speaker to adjust the configuration of the speaker based on the new location may be performed by changing a directionality of the speaker.

The method may further include displaying a secondary image in a background window and displaying the image of the second caller in a foreground window; and if the first caller changes location from the original location to the new location, moving the window to a different position on the display which corresponds to the determined new location without interrupting display of the secondary image in the background window.

According to an aspect of an exemplary embodiment, there is provided a display apparatus including: a video receiver which receives a video signal; a signal processor which processes the video signal received by the video receiver to be displayable; a display unit which displays an image based on a video signal processed by the signal processor; a camera unit which includes a first camera and a second camera spaced apart from the first camera at a predetermined distance, and capture images of an object; a microphone unit which includes at least one microphone that captures audio data of the object, and a controller which receives the images of the object taken by the camera unit and audio data captured by the microphone unit, determines a location of the object with respect to the microphone unit on the basis of the images of the object captured by the respective first and second cameras, and adjusts the received audio data in accordance with the determined location of the object.

The location of the object with respect to the microphone unit may include a distance between the microphone unit and the object and a relative angle of the object with respect to the microphone unit.

The microphone unit may include a plurality of microphones spaced apart from one another and arranged in parallel, and the controller may determine the location of the object with respect to the respective microphones and individually adjust the audio data collected through the respective microphones.

The microphone may include a non-directional microphone.

The microphone may include a unidirectional microphone.

Each of the first camera and the second camera may include a stereoscopic camera.

The controller may determine relative angles of a user with respect to the first and second cameras on the basis of image data transmitted from the first and second cameras, and determine the location of the object with respect to the microphone unit on the basis of the determined angles.

The apparatus may further include a communication unit that is communicably linked to an external device through a network, and the signal processor may transmit the adjusted audio data and the image data of the object to the communication unit, and output the image data and the audio data received from the communication unit to the display unit and the speaker, respectively.

According to an aspect of another exemplary embodiment, there is provided a method of controlling a display apparatus, the method including capturing images of a preset object through a camera unit including a first camera and a second camera spaced apart from the first camera at a predetermined distance; capturing audio data from the object through a microphone unit including at least one microphone; determining the location of the object with respect to the microphone unit on the basis of the images of the object captured by the respective first and second cameras, adjusting the audio data collected through the microphone unit in accordance with the computed location, and transmitting the image and the adjusted audio data to a network.

The location information of the object with respect to the microphone unit may include a distance between the microphone unit and the object, and a relative angle of the object with respect to the microphone unit.

The microphone unit may include a plurality of microphones spaced apart from one another and arranged in parallel, and the adjusting audio data may include determining the location of the object with respect to the respective microphones; and individually adjusting the audio data collected through the respective microphones.

According to an exemplary embodiment, the microphone may include a non-directional microphone.

The microphone may include a unidirectional microphone.

Each of the first camera and the second camera may include a stereoscopic camera.

The adjusting the audio data may include determining relative angles of a user with respect to the first and second cameras on the basis of image data transmitted from the first and second cameras; and determining the location of the object with respect to the microphone unit on the basis of the determined angles.

BRIEF DESCRIPTION OF THE DRAWINGS

The above and/or other aspects of exemplary embodiments will become apparent and more readily appreciated from the following description, taken in conjunction with the accompanying drawings of which.

DETAILED DESCRIPTION OF EXEMPLARY EMBODIMENTS

Hereinafter, exemplary embodiments will be described with reference to accompanying drawings, wherein like numerals refer to like elements and repetitive descriptions will be avoided as necessary.

Figure 1:
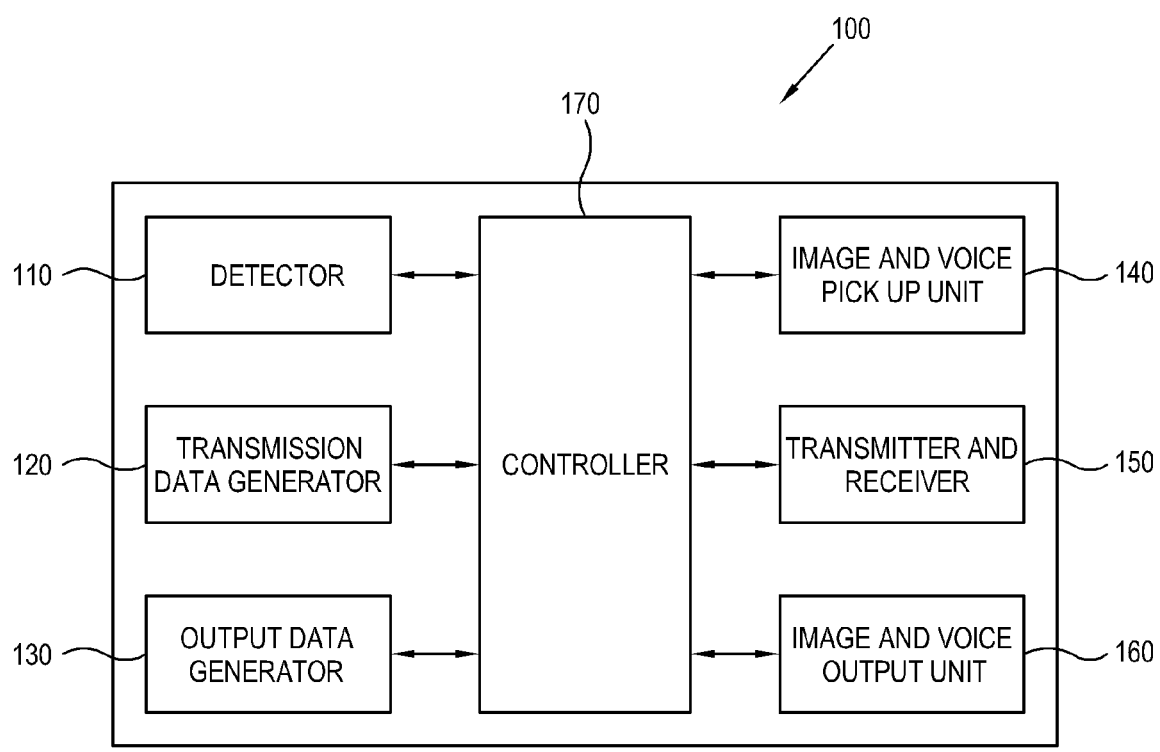
FIG. 1 illustrates an example of a video call apparatus according to an exemplary embodiment.

A video calling apparatus according to an exemplary embodiment is shown in FIG. 1. The apparatus 100 includes a detector 110 which detects a location of a user with respect to a predetermined point. The predetermined point may be a point on a display apparatus, for example, or any other point that may be used as a reference point. The apparatus further includes a transmission data generator 120 for generating encoded packets to transfer to another caller. An output data generator 130 decodes packets received from another caller. An image and voice pickup unit 140 for capturing an image and a voice signal from a caller using the apparatus. A transmitter and receiver 150 transmits to and receives from another caller, an image and voice. An output unit 160 outputs image and voice signals. A controller 170 controls the overall operation of the apparatus.

According to an exemplary embodiment, the transmitter and receiver 150 which transmits to and receives data from another caller, may utilize any network connection between at least two parties to a video call. The network can be any type whereby a connection between parties may occur, such as over a local area network or over the interne. Also, while many of the examples discussed herein describe a call between two parties, the number of parties between which a video call can take place is not limited to two under the exemplary embodiments. On the contrary, one of ordinary skill in the art would recognize that the exemplary embodiments described herein may equally apply to video calls involving a plurality of callers.

Figure 2:
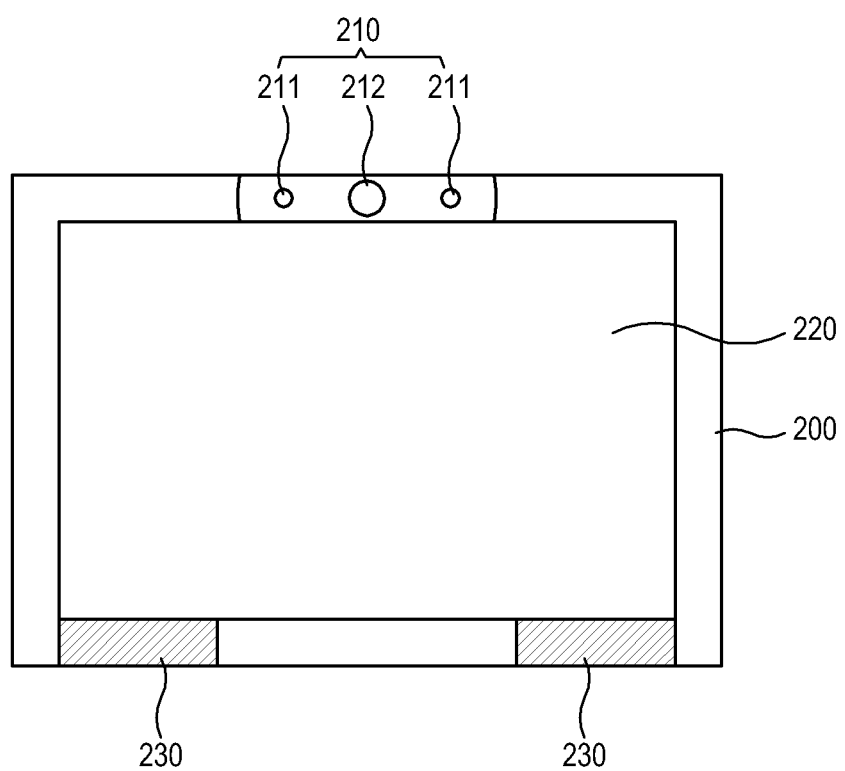
FIG. 2 illustrates another example of a video call apparatus according to an exemplary embodiment.

The image and voice pickup may include a camera and a microphone, for example, which respectively capture an image and a voice signal from a caller using the apparatus. FIG. 2 shows an example of a video call apparatus 200 including an image and voice pickup part 210, a display 220 and speakers 230. The image and voice pickup part 210 may include an image sensor 211 and microphones 212.

Image sensor 211 may be any type of device capable of receiving an image of the caller. For example, image sensor 211 may be a traditional camera such as a charge-coupled device (CCD) camera, a complementary metal-oxide-semiconductor (CMOS) active-pixel sensor (APS) camera, etc. Alternatively, the image sensor may be a non-traditional type of camera such as a thermographic camera (e.g., Forward Looking InfraRed (FLIR)), etc. However, the exemplary embodiment is not limited to these types of image sensors, and as noted above, the exemplary embodiment may employ any device capable of receiving an image of the caller. Further, image sensor 211 may include more than one image sensing device. For example, image sensor 211 may be a stereo camera, or may be two or more separate cameras, etc.

The microphone 212 may be any type of microphone which is capable of receiving a voice input signal from a caller. For example, a directional microphone array may be used to pinpoint a location of a caller based on a voice input signal. However, the exemplary embodiment is not limited to just this type of microphone, and as noted above, may employ any device capable of receiving a voice input signal from a caller.

It should also be noted that while some exemplary embodiments may utilize both an image sensor and a microphone for locating a position of a caller using both imaging and sound, other exemplary embodiments include locating a position of a caller using either imaging or sound. That is, the position locating operation as described herein may either be performed by the image sensor, the microphone, or both. Thus, the above-noted image sensor may or may not be employed to locate a position of a caller. Likewise, the above-noted microphone may or may not be capable of locating a position of a caller based on sound.

Figure 3:
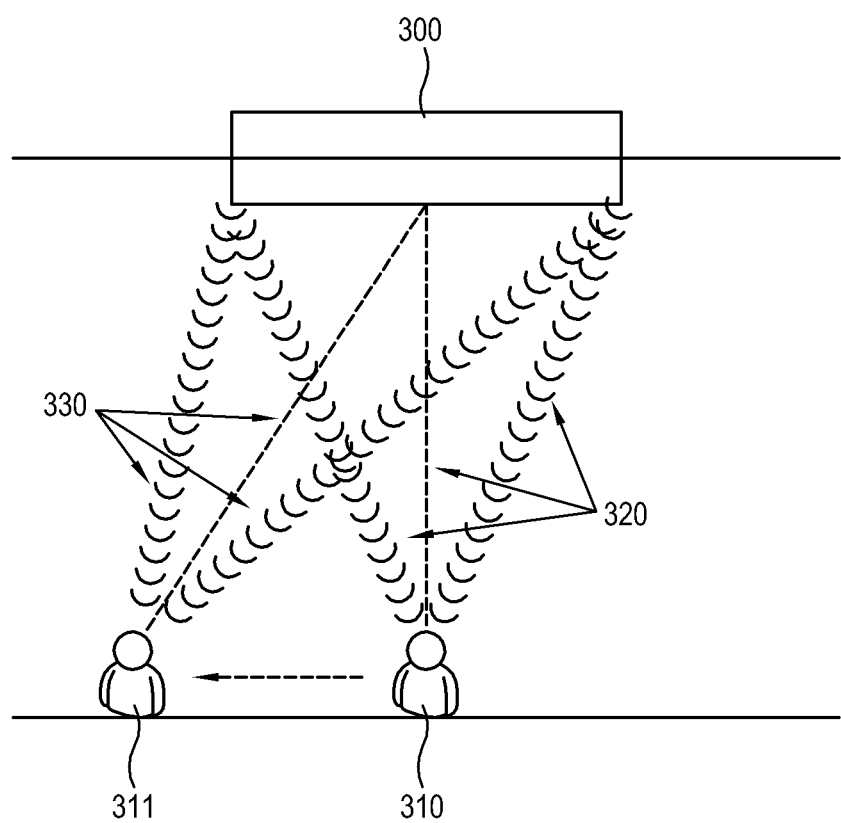
FIG. 3 illustrates an example of an operation of a video call apparatus according to an exemplary embodiment.

FIG. 3 illustrates an operation of a video call apparatus according to an exemplary embodiment. A user is first located at an original position 310 in the center of the video call apparatus 300. The image sensor and microphone reception focus areas as well as the speaker output signals (collectively shown as "320") are focused on the caller's position with respect to the center of the video call apparatus 300. If the caller changes her position to a new position 311, the video call apparatus 300 can adjust the image sensor and microphone reception focus areas as well as the speaker output signals (collectively shown as "330") so as to focus on the caller's new position 311 with respect to the center of the video call apparatus 300. Accordingly, a caller may move her location to a new position and still maintain an optimal video call connection with another caller.

The adjustment of the image sensor based on the determined new location may be accomplished by changing at least one of a pan angle, tilt angle and a zoom value of the image sensor to correspond to the detected change in location of the first caller. The adjustment of the microphone and the speaker(s) based on the new location that has been determined for a caller may be accomplished by changing a directionality of the microphone and the speaker(s). One of ordinary skill in the art would recognize that the change in directionality of the microphone and/or speaker(s) could be accomplished via hardware and/or software.

Additionally, it should be noted that while some exemplary embodiments describe the image sensor, the microphone and the speakers as collectively adjusting based on a new position that has been determined for the caller, an exemplary embodiment does not require that all three components of the video call apparatus be adjusted. For example, another exemplary embodiment may only adjust the microphone, or only the speakers, etc. Likewise, yet another exemplary embodiment may only adjust some combination of the components, such as the microphone and the speakers, or the microphone and image sensor, etc. One of ordinary skill in the art would recognize that different embodiments and combinations are possible within the scope of the exemplary embodiments.

Figure 4A:
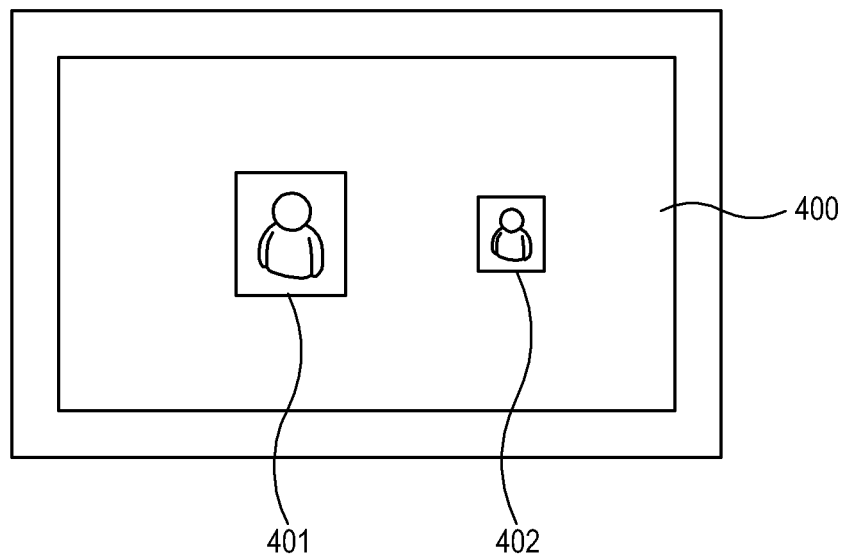
FIG. 4A illustrates an example of an operation of a video call apparatus according to an exemplary embodiment.

According to an exemplary embodiment, the video call apparatus may display one or both of the parties to a video call. FIG. 4A shows an example of an operation of the video call apparatus according to an exemplary embodiment whereby windows displaying both the called party 401 and the caller 402 are displayed on the display 400. However, one of ordinary skill in the art would recognize that it is not necessary to display windows for all parties to a call. For example, the display might simply display the called party, or the calling party.

Figure 4B:
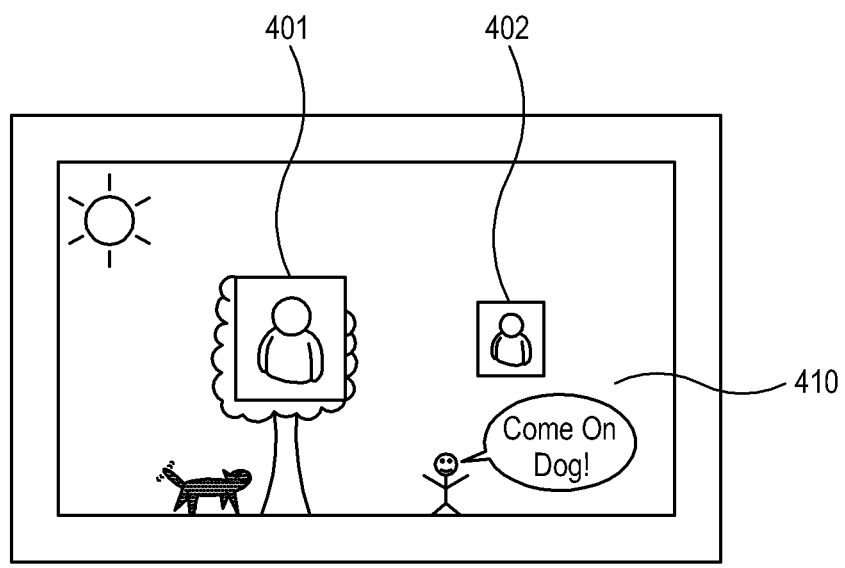
FIG. 4B illustrates an example of an operation of a video call apparatus according to an exemplary embodiment.

FIG. 4B shows another exemplary embodiment, whereby an image of a selected program 410 is displayed in the background while windows displaying both the called party 401 and the caller 402 are displayed in the foreground on the display 400. In this exemplary embodiment, the selected program 410 (i.e., the background program) runs uninterrupted by the operation of the video call and displays windows for both the called party 401 and the caller 402. Again, the exemplary embodiment is not limited to this example, and one of ordinary skill in the art would understand that displaying the foreground windows and background program can be organized in various ways, including both spatially and temporally.

As mentioned previously, the displayed "image" of the previously selected program 410 in FIG. 4B may include, for example, a still image or a collection of images such as in a broadcast video signal. Of course, one of ordinary skill in the art would recognize that the windows displaying both the called party 401 and the caller 402 may be displayed in locations other than those depicted in FIG. 4B. Additionally, as noted above with respect to FIG. 4A, it is not necessary to display windows for all of the parties to a call.

Figure 5A:
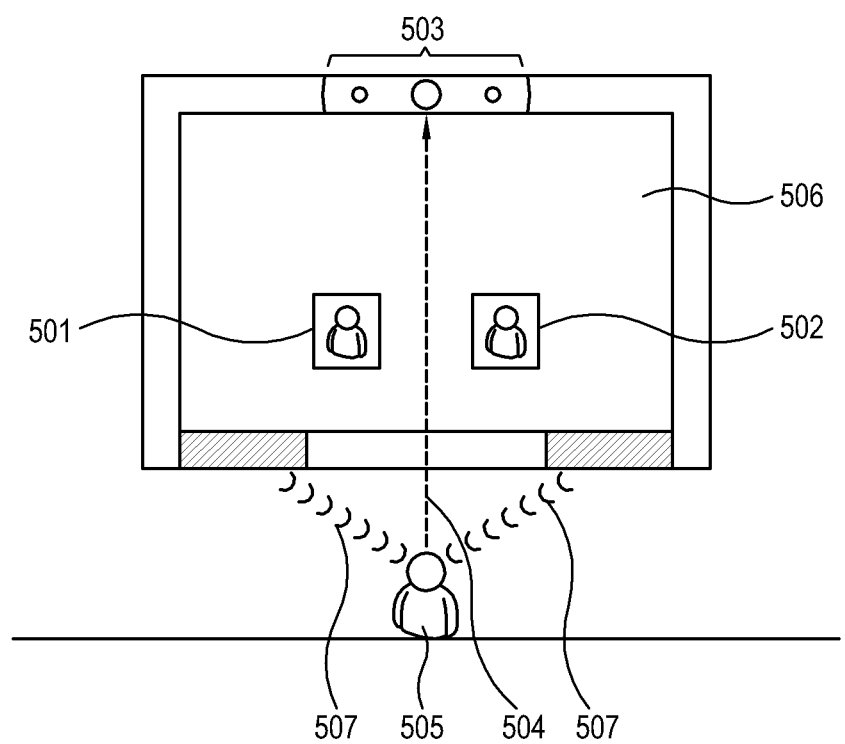
FIG. 5A illustrates an example of an operation of a video call apparatus according to an exemplary embodiment.

FIG. 5A illustrates an example of an operation of a video call apparatus according to an exemplary embodiment. If a caller 505 sits in a location corresponding, for example, to a center point with respect to an image and voice pickup part 503, windows displaying both the called party 501 and the caller 502 may be displayed in locations which are optimal for the position of the caller 505, e.g., about a central axis of the display 506. As noted above, the image sensor and microphone reception focus areas 504, as well as the directionality of the speaker output signals 507 are optimally directed for the position of the caller 505.

Figure 5B:
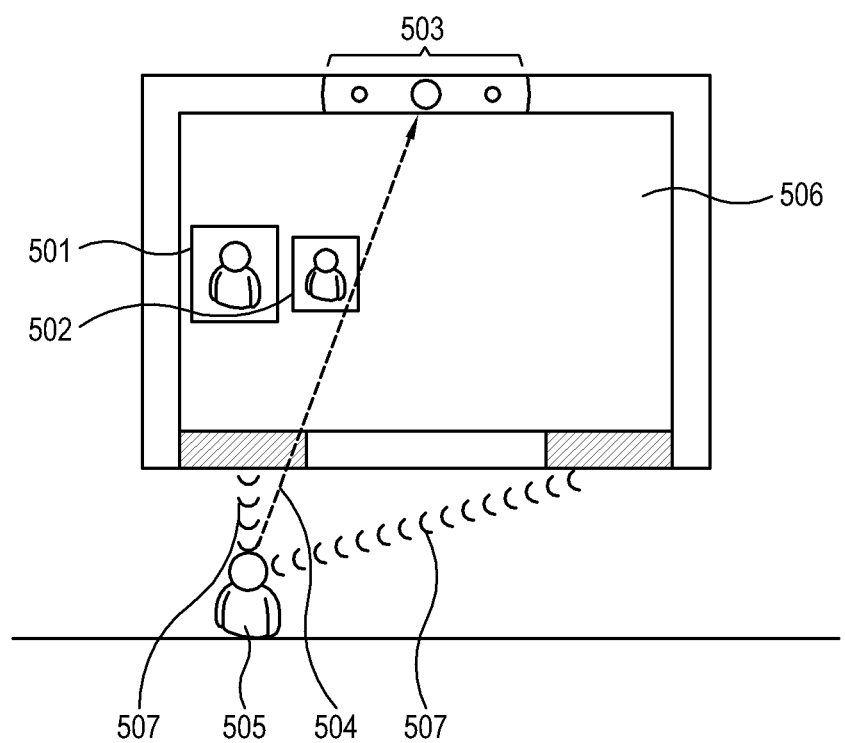
FIG. 5B illustrates an example of an operation of a video call apparatus according to an exemplary embodiment.

However, as shown in FIG. 5B, if the user moves to a new location, the windows displaying both the called party 501 and the caller 502 may likewise be shifted to one side of the display 506 so as to maintain an optimal placing based on the new location of the caller 505. Of course, the determination of which location is "optimal" may depend on the preference of the user, the size of the screen, etc. For example, a user may prefer to have the windows displaying both the called party 501 and the caller 502 shift in a direction opposite to the direction of the change in location of the caller 505 (e.g., the caller 505 moves left but the windows 501, 502 move right).

Alternatively, the windows displaying both the called party 501 and the caller 502 might be made to move in different directions. For example, if the caller 505 moves to the left, the caller 505 might choose to move the window displaying herself 502 to the right, while choosing to have the window displaying the called party 501 move to the left. Thus, according to an exemplary embodiment, the organization and displaying of call windows 501, 502 may be set up based on a user's preference.

Figure 6:
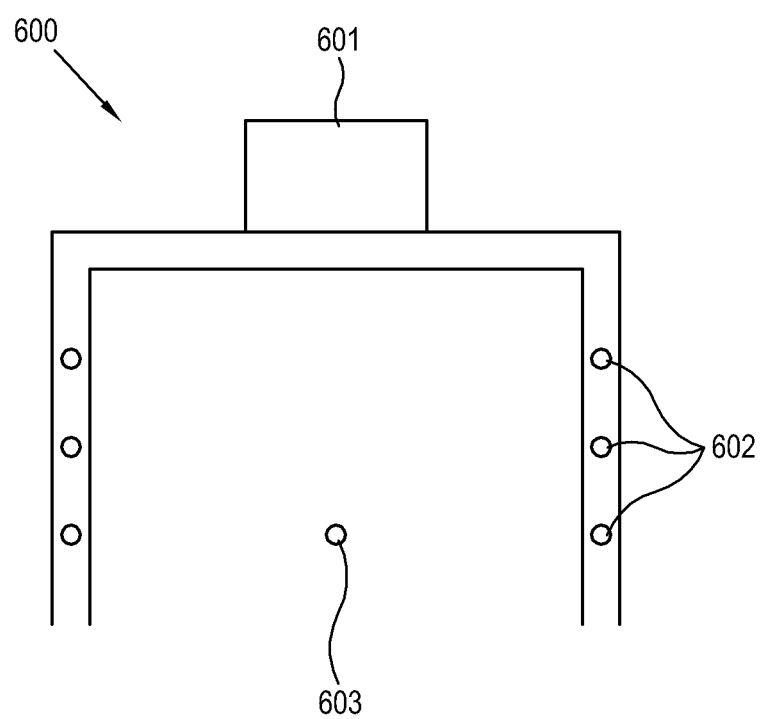
FIG. 6 illustrates an example of an operation of a video call apparatus according to an exemplary embodiment.

The above exemplary embodiments above describe a video call between a caller and a called party. However, another exemplary embodiment includes an apparatus which is suited for a conference room setting. For example, FIG. 6 shows a conference room-type system 600 having a display 601, a distributed plurality of microphones 602, and a centrally located image sensor 603. Speakers (not shown) may be located at the display 601, or elsewhere. In this setting, if a person begins to speak into a microphone, the system can determine which microphone is being used. Based on that determination, the system can designate the active speaker as the location of the caller. Afterwards, if a different person speaks into a different microphone, the system can determine the location of the different person speaking as being the "new location" of the caller, and then adjust the equipment so as to focus on the new location. As noted above, at least one of the image sensor 603, microphones 602 and speakers can be adjusted based on the determined location of the caller.

In the example illustrated in FIG. 6, the location of the caller does not change, but rather the identity of the caller changes. Thus, the system must determine which speaker is currently speaking and then adjust at least one of the image sensor(s), microphone(s) and speaker(s) based on the location of the person currently speaking. As noted above, the image sensor 603 may include more than one image sensing device. The location of the person currently speaking may be determined, for example, based on an audio signal received by the microphone(s), and/or images received by the image sensor.

Figure 7:
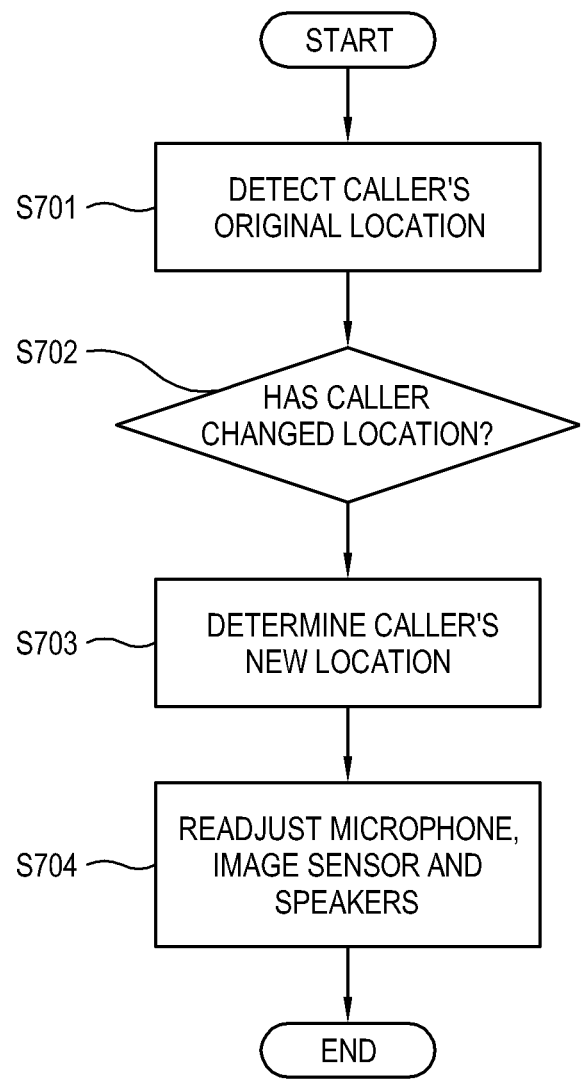
FIG. 7 illustrates an example of a method of operating a video call apparatus according to an exemplary embodiment.

FIG. 7 illustrates an example of a method of operating a video call apparatus according to an exemplary embodiment. Initially, a caller's original location is determined in operation S701. Then, if a caller's location is determined to have changed in operation 5702, the caller's new location is determined in operation 5703. Once the new location is determined, at least one of the image sensor, microphone(s) and speaker(s) can be adjusted in operation S704 so as to focus on the new location where the caller has been determined to be.

As described in the foregoing embodiments, it is important to detect a location of a caller, i.e., a user U, in performing a video call. For example, audio data of a user U collected through a microphone undergoes different post processing in accordance with different locations of a user U. The post-processing is also called acoustic signal processing. In a situation where there is a plurality of microphones, the acoustic signal processing uses distances between the microphones, delayed time of voices collected in the respective microphones, etc. as parameters, and extracts the audio data of a user U, of which an error is minimized and noise is removed using the above parameter (or parameters).

The acoustic signal processing may use various parameters in a design stage, and thus its detailed method does not limit the scope of the present exemplary embodiment. However, as described above, parameters used in the post processing of the audio data are varied depending on the locations of a user U. Accordingly, current location information of a user U is derived in this exemplary embodiment, and the foregoing post processing is implemented in accordance with the derived results.

Here, the location information of a user U contains not only a location about left and right directions with respect to the display apparatus, but also a location with respect to an approaching or receding direction with regard to the display apparatus.

Figure 8:
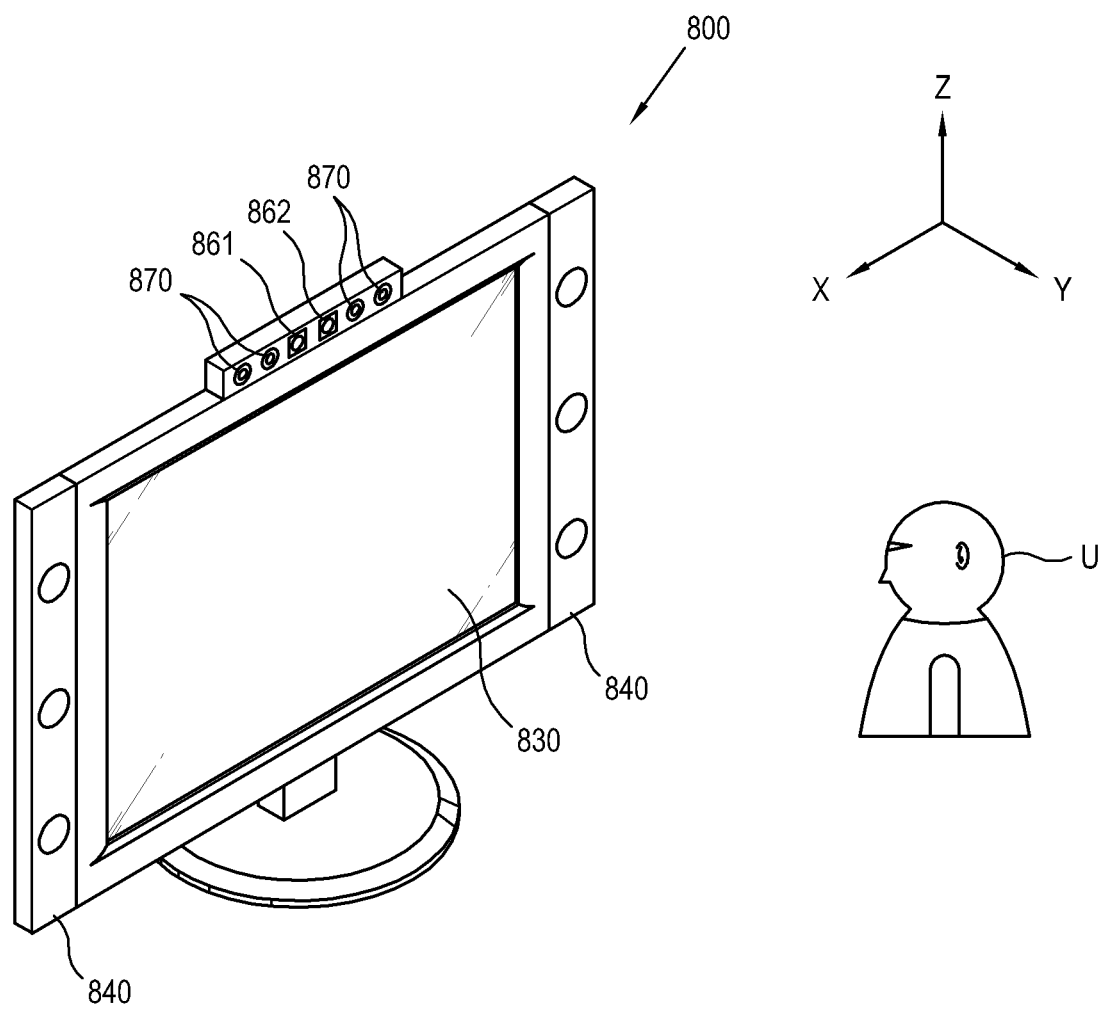
FIG. 8 is a perspective view of a display apparatus according to an exemplary embodiment.

Exemplary embodiments reflecting the foregoing aspect will be described with reference to the accompanying drawings. FIG. 8 is a perspective view of a display apparatus 800 according to an exemplary embodiment, and FIG. 9 is a block diagram of the display apparatus 800 of FIG. 8.

In accordance with the present exemplary embodiment, the display apparatus 800 may be implemented as a TV in which a video call is possible, but is not limited thereto. Alternatively, the display apparatus 800 may be implemented by other apparatuses. The foregoing exemplary embodiment may be applied to the configurations of the display apparatus 800 common to those disclosed in the foregoing exemplary embodiment, and thus repetitive descriptions will be avoided.

First, each direction shown in the accompanying drawings will be described. The X direction indicates a horizontal direction of the display apparatus 800 parallel to an installation surface, the Y direction indicates a frontward direction of the display apparatus 800 facing a preset object U, and the Z direction indicates a vertical direction of the display apparatus 800 perpendicular to the installation surface. That is, an image is displayed on the X-Z plane of the display unit 830, and an object U is located in the Y direction from the view of the display apparatus 830. As described below, each of the drawings and embodiments are described on the basis of the foregoing definition of the X, Y and Z directions. Here, directions opposite to the X, Y and Z directions are represented as −X, −Y and −Z directions, and the X-Z plane indicates a plan formed by the X-directional axis and the Z-directional axis.

Figure 9:
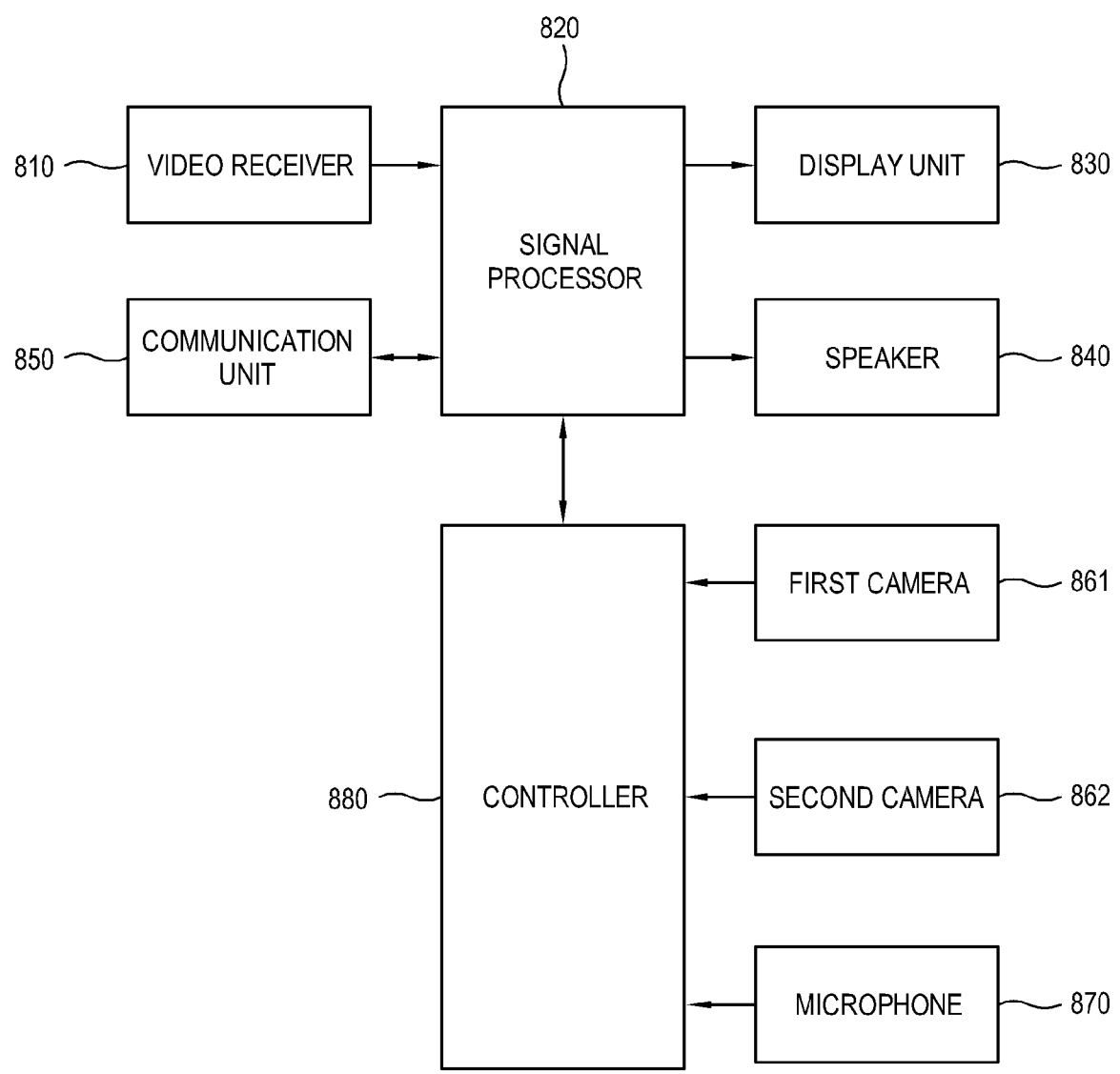
FIG. 9 is a block diagram of the display apparatus of FIG. 8.

As shown in FIGS. 8 and 9, the display apparatus 800 includes a video receiver 810 which receives a signal including video and audio data sent from an external device (not shown) to the apparatus. A signal processor 820 processes the video and audio data of the signal received by the video receiver 810 in accordance with a preset process. The display unit 830 displays an image based on the video data processed by the signal processor 820, and a speaker 840 outputs sound based on the audio data processed by the signal processor 820.

Further, the display apparatus 800 includes a communication unit 850 connected to and communicable with other apparatuses (not shown), which are not limited in their configuration, through a network. A plurality of cameras 861 and 862 capture an image of the preset object U which is located in front of the display apparatus 800. At least one microphone 870 obtains audio data from the object U. A controller 880 receives the video data and the audio data from the cameras 861 and 862 and the microphone 870, respectively, and controls the signal processor 820 to process the received data for transmission to the communication unit 850.

The display apparatus 800 in this exemplary embodiment enables the object U to take part in the video call, and the object U is a user U, but the embodiment is not limited thereto. Alternatively, the object U of which the video and audio data are captured is not a person.

With this configuration, the controller 880 in this embodiment determines the location of a user U with respect to the microphone 870 on the basis of his/her images collected by the respective cameras 861 and 862. Further, the controller 880 adjusts the audio data collected by and received from the microphone 870 in accordance with the determined location of a user U with respect to the microphone 870.

Thus, the display apparatus 800 can easily determine the location of a user U in the left and right directions and the approaching/receding direction by simple algorithm, and can adjust the audio data in a different fashion, in accordance with the determined results, thereby acquiring the optimum audio data corresponding to the current location of a user U.

Below, the elements involved in the display apparatus 800 will be described.

The video receiver 810 receives a video signal and transmits it to the signal processor 820, which can be implemented in accordance with the formats of the received video signal and the different types of the display apparatus 800.

For example, if the type of the display apparatus 800 is a TV, the video receiver 810 can wirelessly receive a radio frequency (RF) signal from a broadcasting station (not shown), or can receive a video signal via a wire based on composite video, component video, super video, syndicat des constructeurs des appareils radiorecepteurs et televiseurs (SCART), high definition multimedia interface (HDMI), or the like, standards. In the situation where the video signal is a broadcasting signal, the video receiver 810 includes a tuner capable of tuning to a channel.

If the display apparatus 800 is a monitor for a computer, the video receiver 810 may be implemented by a D-SUB capable of transmitting an RGB signal based on VGA, a digital video interactive (DVI)-analog (A), a DVI-integrated digital/analog (I) and DVI-digital (D), or an HDMI. Also, the video receiver 810 may be implemented by a DisplayPort, a unified display interface (UDI), or a wireless HD, etc.

The signal processor 820 performs various video processes previously set up with respect to the video data of the video signal. The signal processor 820 performs such a process to output a video signal to the display unit 830, so that an image can be displayed on the display unit 830. Also, the signal processor 820 applies a separate process to the audio data for the video signal. To this end, the signal processor 820 may include separate elements for processing the video data and the audio data, respectively.

There is no limit as to the kind of video processes performed by the signal processor 820. For example, the video process may include decoding and encoding according to various video formats, de-interlacing, frame refresh rate conversion, scaling, noise reduction for enhancing picture quality, detail enhancement, line scanning, etc. The signal processor 820 may be implemented by individual configurations for independently performing the respective video processes or by an integrated configuration where many functions are integrated.

Also, the signal processor 820 outputs the video data and the audio data received through the communication unit 850 to the display unit 830 and the speaker 840, respectively, so that the display apparatus 800 can realize the video call. Further, the signal processor 820 processes the video and audio data of a user U, transmitted from the controller 880, and transmits the processed video and audio data to an external device (not shown), that is external to the apparatus, through the communication unit 850.

In this exemplary embodiment, the signal processor 820 processes both the video signal received from the video receiver 810 and the data transmitted and received through the communication unit 850, but the present exemplary embodiment is not limited thereto and alternative configurations for performing the foregoing respective functions may be separately provided.

For example, the display unit 830 may be implemented by a liquid crystal display (LCD) panel, but is not limited thereto. The display unit 830 displays an image based on a video signal processed by the signal processor 820. The display unit 830 displays a video frame on a display area on the X-Z plane by vertically arranging a plurality of horizontal scan lines scanned by the signal processor 820.

The speaker 840 outputs the audio data processed by the signal processor 820 in the form of sound.

The communication unit 850 connects the display apparatus 800 with one or more external devices (not shown) through a network, thereby making communication possible between the display apparatus 800 and the external devices. The communication unit 850 transmits the video data and the audio data received from the external device to the signal processor 820. The received video data and audio data are transmitted from signal process 820 to the controller 880 on the basis of a preset communication protocol. The video and audio data from the signal processor 820 and the controller 880 are transmitted to the external devices (not shown), which are connected to the network.

The cameras 861 and 862 capture an image of a user U placed in front of the display apparatus 800 and transmit the image to the controller 880. The camera 861, 862 may be implemented by a stereoscopic camera or a three-dimensional camera. Thus, it is possible to acquire the location of a user U from the image obtained from the camera. That is, it is possible to derive a relative angle of a user U with regard to the cameras 861 and 862 on the X-Y plane from the image of a user U taken by the cameras 861 and 862.

The cameras 861, 862 includes a first camera 861 and a second camera 862 spaced apart from each other at a predetermined distance. In this embodiment, there are a plurality of cameras 861 and 862. The respective cameras 861 and 862 are spaced apart from one another, so that it is possible to determine the location of a user U. In particular, it is possible to determine how distant a user is in the Y direction from the cameras 861 and 862. If only one camera is provided or if the plurality of cameras are not spaced apart from one another by a sufficient distance, it is difficult to determine the location of a user U with respect to the microphone 870 (to be described later).

There are a plurality of microphones 870 arranged in parallel, and spaced apart from each other. The microphone 870 collects the audio data from a user U and transmits it to the controller 880. In this exemplary embodiment, the microphone 870 is implemented by a non-directional microphone, which collects the audio data with uniform sensitivity in all directions within a predetermined range from where the microphone 870 is placed. The non-directional microphone is suitable for representing the presence of a "collection environment" since the microphone approximately uniformly collects the sound/voice of a surrounding environment. Therefore, the non-directional microphone can be used when the display apparatus 800 is installed inside a room.

However, the microphone 870 is not limited to the foregoing embodiment. Alternatively, the microphone 870 may be implemented by a unidirectional microphone capable of collecting sound in a specific direction, and selectively collect audio data of a user U who is within an area defined by the microphone 870.

The non-directional microphone and the unidirectional microphone are different in various aspects such as a feedback ratio, feedback increase, tone variation, channel division, etc., so that the microphones can be selected in consideration of various factors such as an installation environment, a structural characteristic, etc., of the display apparatus 800.

In this exemplary embodiment, the cameras 861 and 862 and the microphone 870 are arranged on a straight line parallel with the X direction, but not limited thereto. Such an example is selected to simply and clearly show the exemplary embodiment. Alternatively, the present exemplary embodiment can be achieved even though the cameras 861 and 862 and the microphone 870 are not arranged along a straight line.

The controller 880 controls the signal processor 820 to transmit video and audio data to the communication unit 850 when receiving either or both the video data of a user U taken through the cameras 861 and 862 and/or the audio data collected through the microphone 870. At this time, the controller 880 determines the location of a user U with respect to the microphone 870 and adjusts the audio data in accordance with the determined location.

Detailed methods for adjusting the audio data by the controller 880 may be realized by various configurations of the controller 880. For example, the controller 880 may apply different audio amplification or different noise filtering with respect to the audio data collected through the microphone 870. However, this is simply an example of applicable methods, and does not limit the exemplary embodiment.

Also, the method of adjusting the audio data may be different in accordance with whether the microphone 870 is implemented by a non-directional microphone or a unidirectional microphone. However, this compensation method can be variously applied in the design stage of display apparatus 800, and does not limit the present exemplary embodiment.

Figure 10:
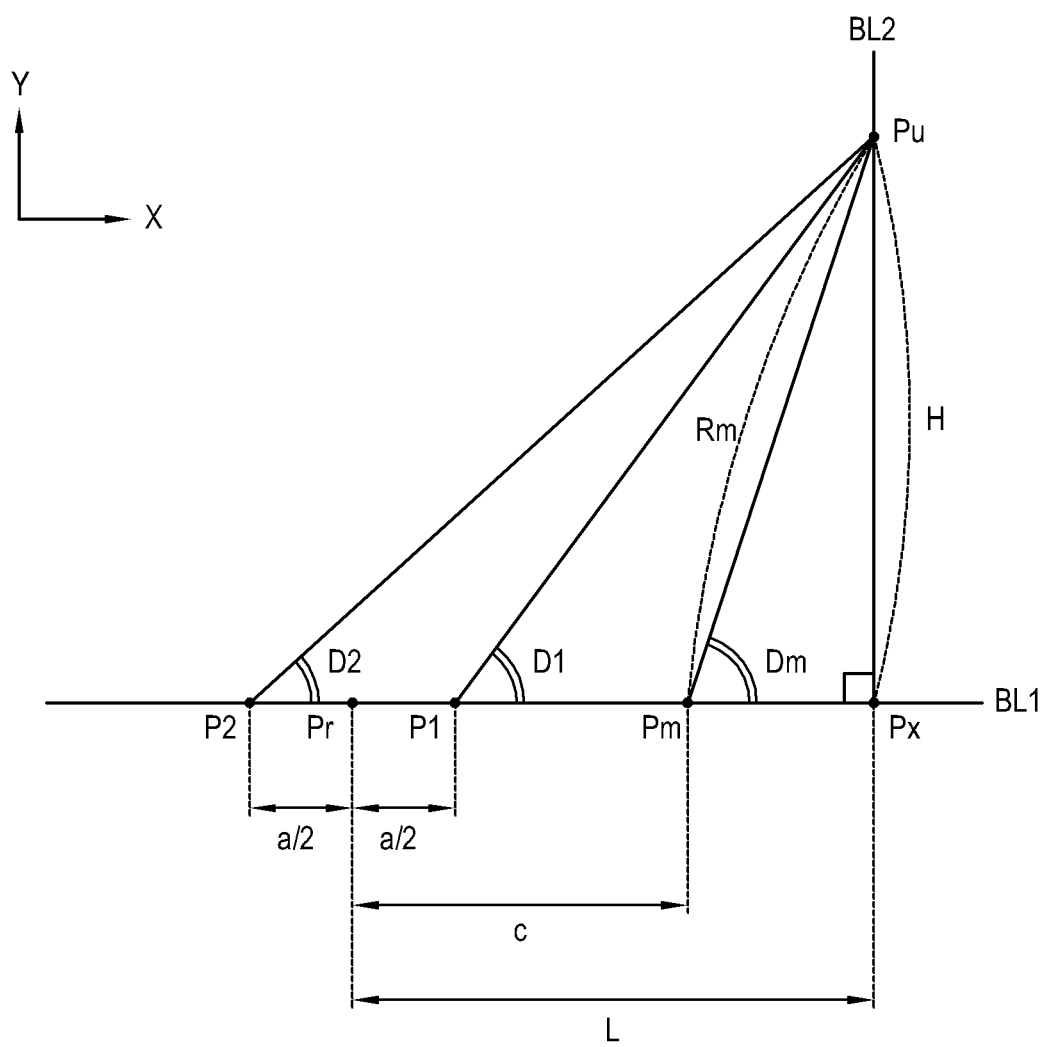
FIG. 10 is a concept view showing a method of computing location information of a user with respect to a microphone in the display apparatus of FIG. 8.

Below, a method of determining the location of a user U relative to the microphone 870 on the basis of the location of a user U taken by the cameras 861 and 862, will be described with respect to FIG. 10. FIG. 10 is a concept view showing a method of determining the location of a user with regard to a microphone, in the display apparatus of FIG. 8.

In this exemplary embodiment, there are a plurality of microphones 870, but the same principle is applied to each microphone 870. Thus, only one microphone 870 will be representatively described below, and repetitive descriptions regarding the other microphones will be avoided.

FIG. 10 schematically shows a location relationship between the first camera 861, the second camera 862, the microphone 870 and a user U on the X-Y plane. In this exemplary embodiment, the first camera 861, the second camera 862 and the microphone 870 are arranged on a straight line BL1 parallel with the X direction. On a straight line BL1, the first camera 861, the second camera 862 and the microphone 870 are shown as dots P1, P2 and Pm, respectively. Further, a user U is shown as a dot Pu on a straight line BL2 extended in the Y direction perpendicularly to the straight line BL1.

Here, the location information of a user U relative to the microphone 870, which the controller 880 desires to obtain, includes a distance between the microphone 870 and a user U and an angle of a user U to the microphone 870. The former is a distance Rm between the dots Pm and Pu, and the latter is an angle Dm between the straight line BL1 and a line connecting the dots Pm and Pu.

A method of determining the distance Rm and the angle Dm is as follows.

Since the distance a between the dots P1 and P2 is a value fixed in the design stage of the display apparatus 800, the distance a is a value already designated at an initial state. If a reference dot between the dots P1 and P2 is Pr, the distance between the dots Pr and P1 and the distance between the dots Pr and P2 are the same as a/2. Here, the dot Pr is set up for convenience of calculation.

Also, a distance c between the dots Pr and Pm is a value fixed in the design stage of the display apparatus 800. The distance c is also a value already designated at the initial state.

Consider the case where a dot located where the straight lines BL1 and BL2 are intersected is Px; a distance between the dots Pr and Px is equal to L; and a distance between the dots Px and Pu is equal to H.

When the first camera 861 and the second camera 862 respectively take images of a user U, the first and second cameras 861 and 862 are implemented by the stereoscopic camera and it is thus possible to derive the angle of a user U relative to the respective cameras 861 and 862. That is, it is possible to derive an angle D1 between the straight line BL1 and the straight line connecting the dots P1 and Pu, and an angle D2 between the straight line BL1 and the straight line connecting the dots P2 and Pu.

Since the first camera 861 and the second camera 862 are spaced apart by the distance a, the angles D1 and D2 are different. Thus, the following relational expression can be derived by applying a trigonometrical function to a geometric shape shown in FIG. 10. Since the mathematical formula for deriving the following relational expression is publicly known, a deriving process will be omitted.

$$L = \frac{(\tan D1 + \tan D2)}{(\tan D1 - \tan D2)} \times \frac{a}{2} \qquad < \text{Expression 1} >$$
$$H = \frac{(\tan D1 \times \tan D2)}{(\tan D1 - \tan D2)} \times a$$

In the expression 1, 'tan D1' indicates a tangent value of an angle D1. Thus, the angles D1 and D2 are derived by taking the images of a user U through the first camera 861 and the second camera 862, and an already known value of a and the derived angles D1 and D2 are applied to the expression 1, so that 'L' and 'H' can be obtained.

After obtaining 'L' and 'H', the distance Rm and the angle Dm can be calculated by the following relational expression:

$$Dm = \tan^{-1}\left(\frac{H}{L-c}\right) \qquad < \text{Expression 2} >$$
$$Rm = \frac{H}{\sin Dm}$$

where 'sin Dm' indicates a sine value of the angle Dm. By applying 'L' and 'H' obtained by the expression 1 and an already known distance value c to the expression 2, the distance Rm and the angle Dm can be calculated as the location information of a user U with respect to the microphone 870.

When the location of a user U with respect to the microphone 870 is calculated through the foregoing processes, the controller 880 adjusts the audio data received from the microphone 870 through a preset process on the basis of the calculated location. In the situation where that there are a plurality of microphones 870, the controller 880 calculates the location of a user U with respect to each microphone 870 as described above, and individually adjusts the audio data collected from the respective microphone 870. The individually adjusted audio data is determined before being transmitted to the communication unit 850.

As described above, the display apparatus 800 in this exemplary embodiment can determine the relative location of a user U in the left/right direction and the approaching/receding direction with respect to the microphone 870 on the basis of the images captured by the two cameras 861 and 862. Then, the display apparatus 800 adjusts the audio data in accordance with the determined location, thereby enhancing the quality of audio data of a user U obtained through the microphone 870.

The arrangement shown in FIG. 10 and the location and distance expressions represent an example for achieving the present exemplary embodiment. Thus, such an example may be varied depending on the arrangement of the respective cameras 861 and 862 and the microphone 870 as well as the location of a user U. However, even in that situation, the exemplary embodiment may be achieved by applying and varying the foregoing exemplary embodiment.

Figure 11:
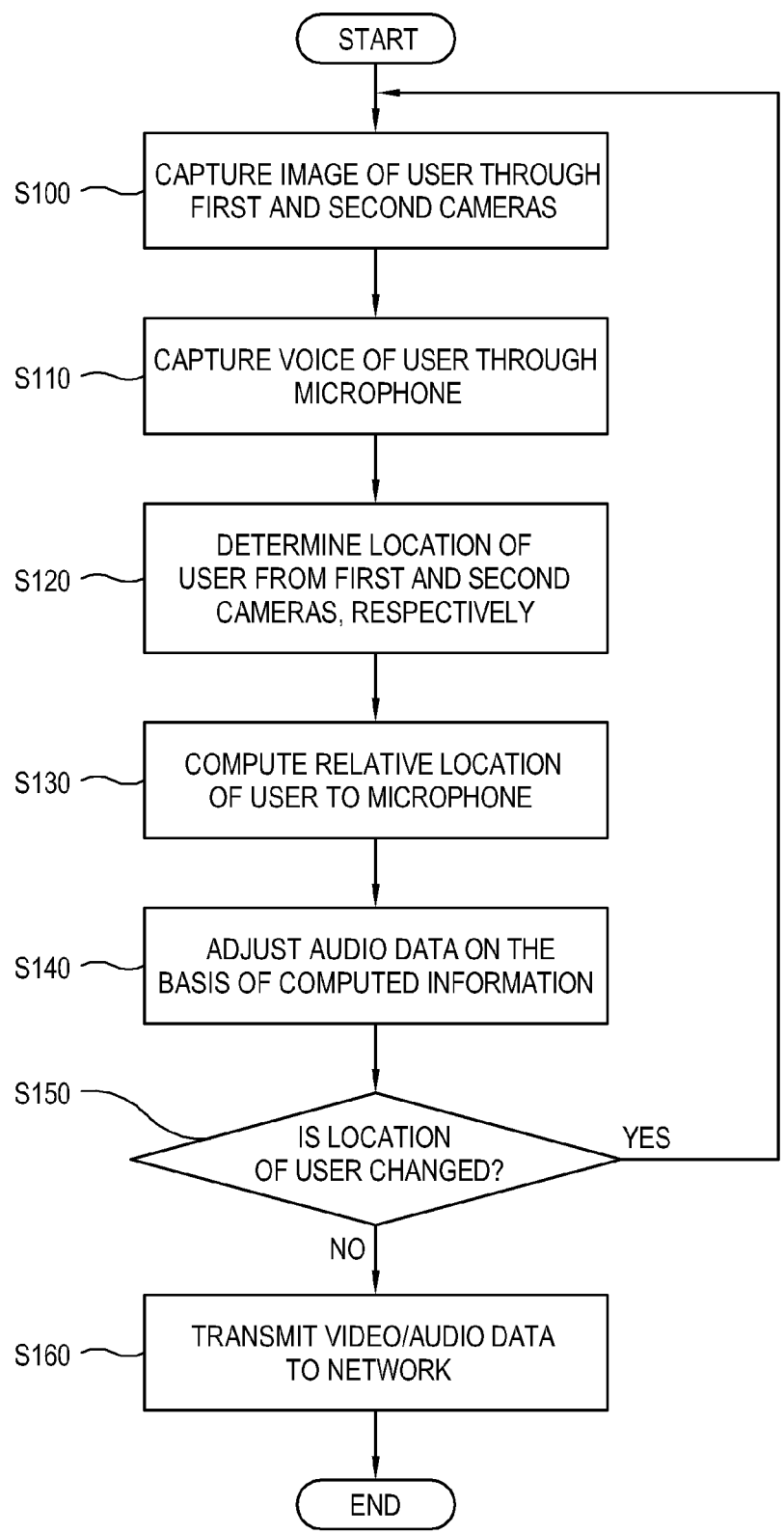
FIG. 11 is a control flowchart showing a control method of the display apparatus of FIG. 8.

Below, a control method of the display apparatus 800 in this exemplary embodiment will be described with reference to FIG. 11. FIG. 11 is a flowchart showing the control method of display apparatus 800.

As shown in FIG. 11, as the display apparatus 800 begins a video call, the first camera 861 and the second camera 862 capture images of a user U (S100), and the microphone 870 captures the audio data of a user U (S110).

The controller 880 determines the location of a user U from the images of the user U captured by the first and second cameras 861 and 862 (S120). Then, the controller 880 determines the location of a user U relative to the microphone 870 on the basis of the determined location of a user U (S130).

When the location of a user U relative to the microphone 870 is determined, the controller 880 adjusts the audio data in accordance with the determined location (S140). The controller 880 monitors whether the location of a user U has changed based on data received from camera 861 and camera 862 (S150). The controller then determines the location of a user U by repeating the above process when it is determined that the location of a user U has changed.

The controller 880 transmits the video and audio data to the network (S160). Thus, the video call is implemented through the display apparatus 800.

The foregoing exemplary embodiments are merely exemplary and are not to be construed as limiting the inventive concept. The present teachings can be readily applied to other types of methods and apparatuses as would be understood by one of ordinary skill in the art. In addition, the description of the exemplary embodiments is intended to be illustrative, and not to limit the scope of the claims, as many alternatives, modifications, and variations will be apparent to those of ordinary skill in the art.

What is claimed is:

1. An apparatus for implementing a video call between a first caller and a second caller, the apparatus comprising:
   an image sensor which captures an image of the first caller;
   a display which displays an image of the second caller;
   a microphone which captures an audio input by the first caller;
   a speaker which outputs an audio input by the second caller;
   a detector which is configured to determine a location of the first caller; and
   a controller which controls the detector to determine the location of the first caller as corresponding to an original location, wherein in response to the first caller changing a location from the original location to a new location, the controller controls the detector to determine the location of the first caller as being the new location and controls the microphone to adjust a configuration of the microphone based on the new location of the first caller.

2. The apparatus of claim 1, wherein in response to the location being determined as the new location, the controller further controls the image sensor to adjust a configuration of the image sensor based on the new location of the first caller.

3. The apparatus of claim 1, wherein, in response to the location of the first caller being determined to be the new location, the controller further controls the speaker to adjust a configuration of the speaker based on the new location of the first caller.

4. The apparatus of claim 1, wherein the controller controls the display to display the image of the second caller in a window, and in response to the first caller changing location from the original location to the new location, the controller controls the display to move the window to a different position on the display corresponding to the new location of the first caller.

5. The apparatus of claim 1, wherein the display further displays an image of the first caller.

6. The apparatus of claim 5, wherein the controller controls the display to display the image of the first caller in a first window at a first position on the display, and displays the image of the second caller in a second window at a second position on the display, and in response to the first caller changing position from the original location to the new location, the controller controls the display to move the first window from the first position to a new first position according to the new location of the first caller, and controls the display to move the second window from the second position to a new second position according to the new location of the first caller.

7. The apparatus of claim 1, wherein the detector determines the location of the first caller by using at least one of the image sensor and the microphone to determine the location of the first caller.

8. The apparatus of claim 2, wherein the configuration of the image sensor is adjusted based on the new location by changing at least one of a pan angle, a tilt angle and a zoom value of the image sensor, to correspond to the detected change in location of the first caller.

9. The apparatus of claim 1, wherein the configuration of the microphone is adjusted based on the new location of the first caller by changing a directionality of the microphone.

10. The apparatus of claim 3, wherein the configuration of the speaker is adjusted based on the new location of the first caller by changing a directionality of the speaker.

11. The apparatus of claim 1, wherein if the display displays a secondary image in a background window, the controller controls the display to display the image of the second caller in a foreground window, and if the first caller changing the location from the original location to the new location, the controller controls the display to move the window to a different position on the display which corresponds to the new location of the first caller without interrupting the display of the secondary image in the background window.

12. A system for implementing a conference video call between a plurality of callers at a first location and at least one caller at a second location, the system comprising:
   an image sensor which captures an image of a caller from among the plurality of callers at the first location;
   a display which displays an image of the at least one caller at the second location;
   a microphone which captures an audio input from the caller from among the plurality of callers at the first location;
   a speaker which outputs an audio input from the at least one caller at the second location;
   a detector which is configured to determine a position of a caller which is currently speaking at the first location; and
   a controller which is configured to control the detector, wherein in response to a first caller, from among the plurality of callers at the first location, beginning to speak, the controller controls the detector to determine the position of the first caller as being a position of the caller, and in response to a second caller, from among the plurality of callers at the first location, beginning to speak, the controller controls the detector to determine the position of the caller currently speaking as being a position of the second party and controls the microphone to adjust a configuration of the microphone based on the determined position of the party currently speaking.

13. The system of claim 12, wherein if the position of the caller currently speaking is determined as being the position of the second caller, the controller further controls the image sensor to adjust a configuration of the image sensor based on the determined second position.

14. The system of claim 12, wherein in response to the position of the caller currently speaking being determined to be the position of the second caller, the controller further controls the speaker to adjust a configuration of the speaker based on the determined second position.

15. A method of implementing a video call between a first caller and a second caller, the method comprising:
   capturing, by an image sensor, an image of the first caller;
   displaying, on a display, an image of the second caller;
   capturing, by a microphone, an audio input by the first caller;
   outputting, by a speaker, an audio input by the second caller;
   determining a location of the first caller with respect to a predetermined position; and
   in response to determining the location of the first caller changes from an original location to a new location, controlling the microphone to adjust a configuration of the microphone based on the new location of the first caller.

16. The method of claim 15, further comprising, in response to determining the location of the first caller changes from the original location to the new location, controlling the image sensor to adjust a configuration the image sensor based on the new location of the first caller.

17. The method of claim 15, further comprising, in response to determining the location of the first caller changes from the original location to the new location, controlling the speaker to adjust a configuration of the speaker based on the new location of the first caller.

18. The method of claim 15, further comprising displaying the image of the second caller in a window, and in response to determining the location of the first caller changes from the original location to the new location, moving the window to a different position on the display which corresponds to the new location of the first caller.

19. The method of claim 15, further comprising displaying on a display an image of the first caller.

20. The method of claim 19, further comprising:
displaying the image of the first caller in a first window at a first position on the display, and the displaying image of the second caller in a second window at a second position on the display, and
in response to determining the location of the first caller changes from the original location to the new location, moving the first window from the first position to a new first position according to the new location of the first caller, and moving the second window from the second position to a new second position according to the new location of the first caller.

21. The method of claim 15, wherein the determining the location of the first caller is performed by using at least one of the image sensor and the microphone.

22. The method of claim 16, wherein the controlling the image sensor to adjust the configuration of the image sensor based on the new location comprises changing at least one of a pan angle, a tilt angle and a zoom value of the image sensor to correspond to the new location of the first caller.

23. The method of claim 15, wherein the controlling the microphone to adjust the configuration of the microphone based on the new location of the first caller comprises changing a directionality of the microphone.

24. The method of claim 17, wherein the controlling the speaker to adjust the configuration of the speaker based on the new location of the first caller comprises changing a directionality of the speaker.

25. The method of claim 15, further comprising:
displaying, on the display, a secondary image in a background window;
displaying, on the display, the image of the second caller in a foreground window; and
in response to determining the location of the first caller changes from the original location to the new location, moving the window to a different position on the display corresponding to the new location of the first caller without interrupting the displaying of the secondary image in the background window.

26. An apparatus for implementing a video call between a first caller and a second caller, the apparatus comprising:
an image sensor which captures an image of the first caller;
a display which displays an image of the second caller;
a detector which is configured to determine a location of the first caller; and
a controller which controls the display to display the image of the second caller in a window, controls the detector to determine the location of the first caller as corresponding to an original location, wherein in response to the first caller changing a location from the original location to a new location, the controller controls the detector to determine the location of the first caller as being the new location, and in response to the first caller changing the location from the original location to the new location, the controller controls the display to move the window to a different position on the display corresponding to the new location of the first caller.

27. The apparatus of claim 26, wherein the display further displays an image of the first caller.

28. The apparatus of claim 27, wherein the controller controls the display to display the image of the first caller in a first window at a first position on the display, and display the image of the second caller in a second window at a second position on the display, and in response to the first caller changing the location from the original location to the new location, the controller controls the display to move the first window from the first position to a new first position according to the new location of the first caller, and controls the display to move the second window from the second position to a new second position according to the new location of the first caller.

29. A display apparatus comprising:
a video receiver which receives video signal;
a signal processor which processes the video signal received by the video receiver;
a display unit which displays an image based on the video signal processed by the signal processor;
a camera unit which comprises a first camera and a second camera which are spaced apart from the first camera at a predetermined distance, and capture images of an object;
a microphone unit which comprises at least one microphone which captures audio data of the object; and
a controller which receives the images of the object captured by the first and second cameras and the audio data captured by the microphone unit, determines a location of the object with respect to the microphone unit based on the images of the object captured by the first and second cameras, and adjusts the received audio data in accordance with the determined location of the object.

30. The apparatus of claim 29, wherein the location of the object with respect to the microphone unit comprises a distance between the microphone unit and the object and a relative angle of the object to the microphone unit.

31. The apparatus of claim 30, wherein the microphone unit comprises a plurality of microphones spaced apart from one another and arranged in parallel, and
the controller determines the location of the object with respect to the respective microphones and individually compensates the audio data collected through the respective microphones.

32. The apparatus of claim 31, wherein the microphone comprises a non-directional microphone.

33. The apparatus of claim 31, wherein the microphone comprises a unidirectional microphone.

34. The apparatus of claim 29, wherein each of the first camera and the second camera comprises a stereoscopic camera.

35. The apparatus of claim 34, wherein the controller determines relative angles of a user with respect to the first and second cameras based on image data transmitted from the first and second cameras, and determines the location of the object with respect to the microphone unit based on the determined angles.

36. The apparatus of claim 29, further comprising a communication unit which is communicably linked to an external device through a network,
wherein the signal processor transmits the compensated audio data and image data of the object to the communication unit, and outputs image data and audio data received from the communication unit to the display unit and the speaker, respectively.

37. A method of controlling a display apparatus, the method comprising
capturing images of an object through a first camera and a second camera spaced apart from the first camera at a predetermined distance;
capturing audio data of the object through a at least one microphone;
determining the location of the object with respect to the microphone based on the images of the object captured by the first and second cameras;
adjusting the audio data captured through the at least one microphone in accordance with the determined location; and
transmitting image data of the object and the adjusted audio data to a network.

38. The method of claim 37, wherein the location of the object with respect to the at least one microphone comprises a distance between the at least one microphone and the object and a relative angle of the object to the at least one microphone.

39. The method of claim 38, wherein the at least one microphone comprises a plurality of microphones spaced apart from one another and arranged in parallel, and
the adjusting of the audio data comprises determining the location information of the object with respect to the respective microphones; and individually adjusting the audio data collected through the respective microphones.

40. The method of claim 38, wherein the at least one microphone comprises a non-directional microphone.

41. The method of claim 38 wherein the at least one microphone comprises a unidirectional microphone.

42. The method of claim 37, wherein each of the first camera and the second camera comprises a stereoscopic camera.

43. The method of claim 42, wherein the adjusting of the audio data comprises:
determining relative angles of a user with respect to the first and second cameras based on image data transmitted from the first and second cameras; and
determining the location of the object with respect to the microphone unit based on the determined angles.

* * * * *